US009111081B2

(12) United States Patent
McBrearty et al.

(10) Patent No.: US 9,111,081 B2
(45) Date of Patent: Aug. 18, 2015

(54) REMOTE DIRECT MEMORY ACCESS AUTHENTICATION OF A DEVICE

(75) Inventors: Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 13/533,582

(22) Filed: Jun. 26, 2012

(65) Prior Publication Data

US 2013/0347088 A1 Dec. 26, 2013

(51) Int. Cl.
*H04L 9/32* (2006.01)
*G06F 21/34* (2013.01)
*G06F 21/31* (2013.01)
*H04L 29/06* (2006.01)

(52) U.S. Cl.
CPC ............... *G06F 21/34* (2013.01); *G06F 21/31* (2013.01); *H04L 63/083* (2013.01); *H04L 63/162* (2013.01); *H04L 63/18* (2013.01); *H04L 2463/082* (2013.01)

(58) Field of Classification Search
CPC ....... G06F 21/31; G06F 21/34; H04L 63/082; H04L 63/083; H04L 63/162; H04L 63/18
USPC ............................................................. 726/7
See application file for complete search history.

(56) References Cited

U.S. PATENT DOCUMENTS

| 6,061,741 | A | * | 5/2000 | Murphy et al. ............... 709/248 |
| 6,718,387 | B1 | * | 4/2004 | Gupta et al. .................. 709/226 |
| 7,971,236 | B1 | | 6/2011 | Lentini |
| 2008/0002578 | A1 | | 1/2008 | Coffman et al. |
| 2009/0037725 | A1 | * | 2/2009 | Farrugia et al. ............... 713/155 |
| 2010/0161855 | A1 | | 6/2010 | Mohamed et al. |
| 2012/0144501 | A1 | * | 6/2012 | Vangpat et al. ................. 726/28 |
| 2013/0159387 | A1 | * | 6/2013 | James et al. .................. 709/203 |

* cited by examiner

*Primary Examiner* — Saleh Najjar
*Assistant Examiner* — Peiliang Pan
(74) *Attorney, Agent, or Firm* — VanLeeuwen & VanLeeuwen; Thomas E. Tyson

(57) ABSTRACT

An approach is provided in which a server receives a first request from a client over a command port connection. The server, in turn, sends a first phase authentication token to the client over the command port and receives a second request from the client over a management port connection. In response, the server sends a second phase authentication token to the client over the management port connection, which the server receives back from the client over the command port connection. In turn, the server authenticates the client to utilize the command port connection accordingly.

16 Claims, 8 Drawing Sheets

| AUTHENTICATION TABLE 400 | | | | |
|---|---|---|---|---|
| Management Port ID | Command Port ID | Thread ID | Client ID | Authentication Completion Phase |
| A | J | X | X | 2 |
| A | K | X | X | 1 |
| A | L | -- | -- | -- |
| A | M | Y | Y | 1 |
| A | N | Y | Y | 2 |

*FIG. 4*

REMOTE DIRECT MEMORY ACCESS AUTHENTICATION OF A DEVICE

BACKGROUND

The present disclosure relates to authenticating a client application command port connection utilizing a dual-port, two-phase security authentication mechanism.

Distributed shared-disk database cluster technologies exist that allow multiple servers to appear as a single database, which helps reduce deployment cost and complexity. These servers utilize different types of connections and corresponding ports to communicate with clients. For example, servers may include management ports to support a management port connection and command ports to support a command port connection. The management port connection may be a socket based protocol and the command port connection may be an RDMA (remote direct memory access) connection utilizing a technology such as uDAPL (user Direct Access Programming Library). In one embodiment, the management ports and command ports accept command requests from an application executing on a client. In this embodiment, the management ports may allow structure allocation and deletion and the command ports are utilized to transmit/receive data requests against the structure.

BRIEF SUMMARY

According to one embodiment of the present disclosure, an approach is provided in which a server receives a first request from a client over a command port connection. The server, in turn, sends a first phase authentication token to the client over the command port and receives a second request from the client over a management port connection. In response, the server sends a second phase authentication token to the client over the management port connection, which the server receives back from the client over the command port connection. In turn, the server authenticates the client to utilize the command port connection accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is a diagram showing an authentication table utilized by a server to track command port connection authentications;

DETAILED DESCRIPTION

Figure 1:
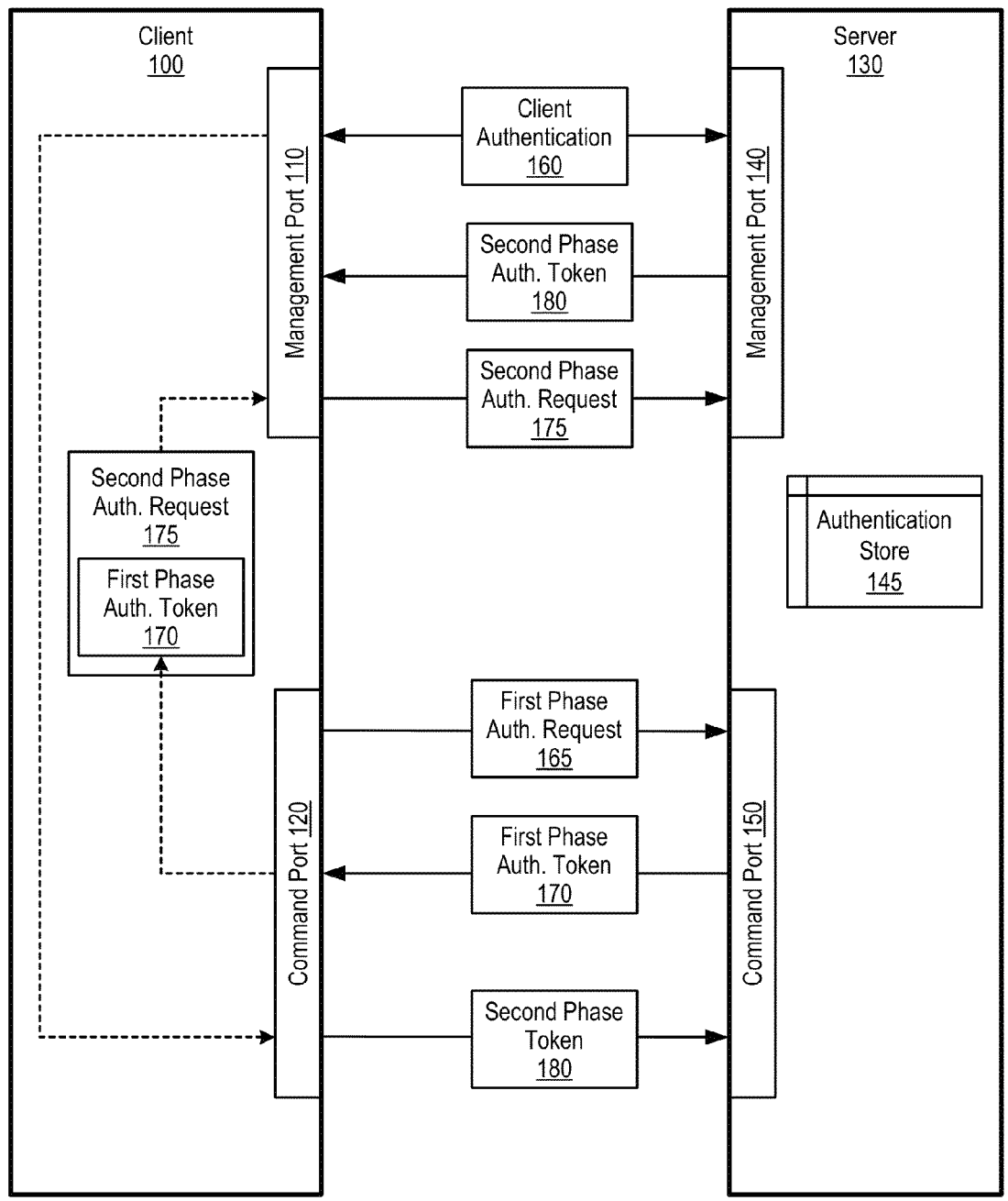
FIG. 1 is a diagram showing a server authenticating a client application command port connection utilizing a dual-port, two-phase security authentication mechanism.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a server authenticating a client application command port connection utilizing a dual-port, two-phase security authentication mechanism. The dual-port two-phase authentication mechanism authenticates a client's command port connection, utilizing a management port connection, prior to allowing the client to transmit/receive data to a server over the command port connection. As those skilled in the art can appreciate, a command port connection may be an RDMA connection or other type of one-to-one connection between the client and the server. As those skilled the art can also appreciate, a management port may be a TCP/IP connection or other type of one-to-many connection between the client and the server.

Client 100 includes management port 110 and command port 120. Likewise, server 130 includes management port 140 and command port 150. Management ports 110 and 140 establish a socket-based management port connection between client 100 and server 130, and command ports 120 and 150 establish a command port connection between client 100 and server 130.

Client 100 and server 130 proceed through an initial socket-based authentication process (authentication 160) to authenticate client 100 (e.g., an application executing on client 100) utilizing management ports 110 and 140. Next, client 100 and server 130 open an RDMA connection over command ports 120 and 150, respectively, and client 100 sends first phase authentication request 165 to server 130. In turn, server 130 generates a security token and sends first phase authentication token 170 to client via command port 150. In one embodiment, client 100 individually requests an opaque authentication token for each RDMA connection over each command port connection (see FIG. 2 and corresponding text for further details).

Client 100, in one embodiment, includes first phase authentication token 170 in a second phase authentication request and sends second phase authentication request 170 to server over the management port connection via ports 110 and 140. At this point, server 130 extracts the first phase authentication token from second phase authentication request and adds a table entry to authentication store 145 that indicates client 100 has completed a first phase of the authentication process (see FIG. 4 and corresponding text for further details).

In turn, server 130 generates and sends a second phase authentication token (second phase authentication token 180) over the management port connection, which includes unique data that identifies the RDMA connection and the current connection state. In one embodiment, second phase authentication token 180 includes first phase authentication token 170 in order for server 130 to match the second phase authentication to the first phase authentication (see FIGS. 5, 6, and corresponding text for further details).

Client 100 receives second phase authentication token 180 from server 130 over the management port connection and re-sends second phase authentication token 180 to server 130 over the command port connection via command ports 120 and 150. When server 130 receives second phase authentication token 180, server 130 accesses authentication store 140 and determines that client 100 previously completed the first phase authentication by locating the recent table entry discussed above. As such, server 130 authenticates client 100's command port connection over command ports 120 and 150. In turn, client 100 is authorized to transmit/receive data to/from server 130 over the authenticated command port connection.

Figure 2:
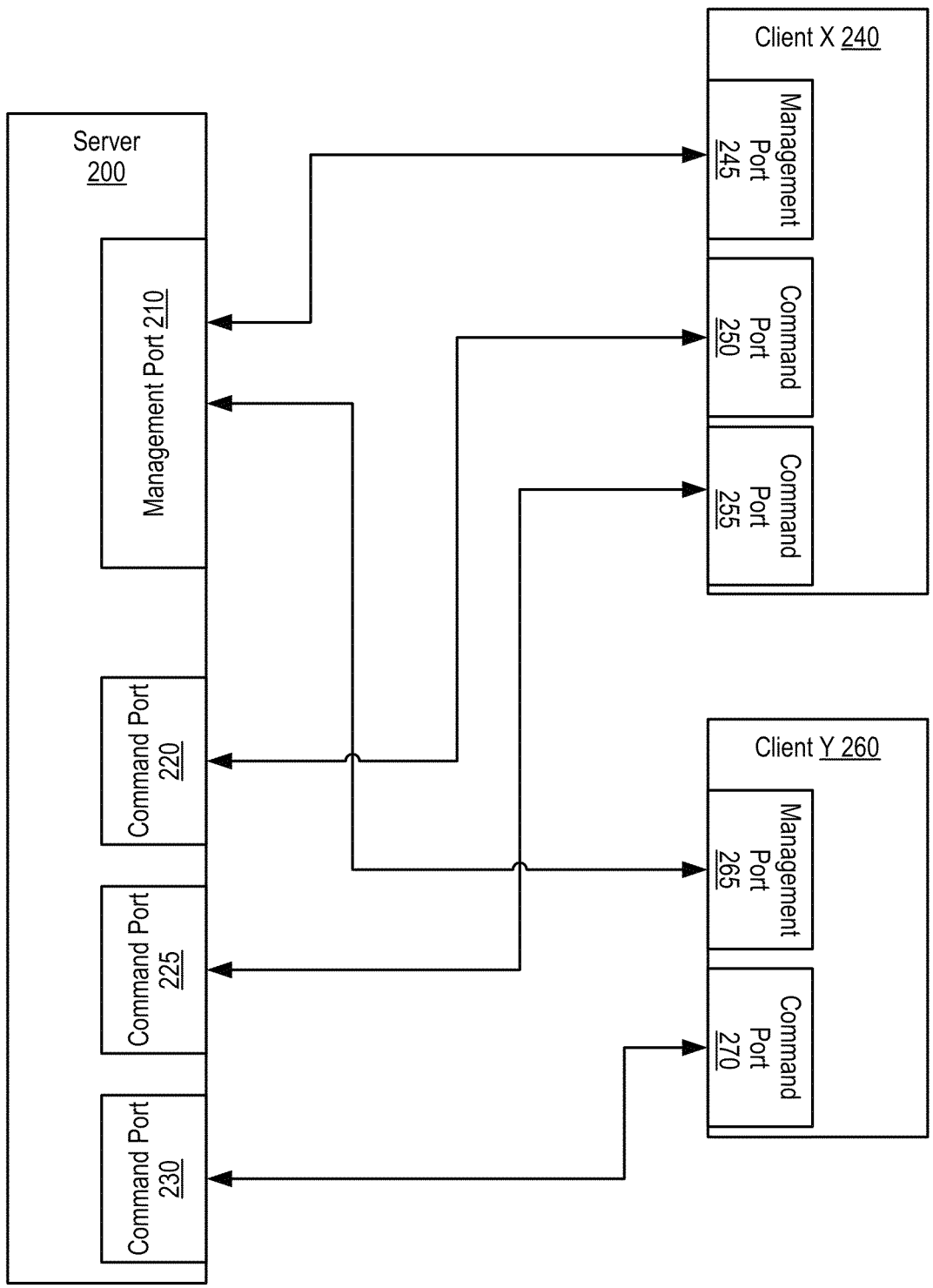
FIG. 2 is a diagram showing a server utilizing one management port to establish multiple command port connections with multiple clients.

FIG. 2 is a diagram showing a server utilizing one management port to establish multiple command port connections with multiple clients. In one embodiment, server 200 may include a small number of management ports (management port 210) and a large number of command ports (ports 220, 225, and 230). In this embodiment, server 200 utilizes management port 210 as discussed herein to establish management port connections with clients 240 and 260 via corresponding management ports 245 and 265.

FIG. 2 shows that client 240 has two command port connections established (or is in process of establishing) with server 200 via command ports 250 and 255 connected to server 200's command ports 220 and 225, respectively. In one embodiment, client 240 utilizes one management port connection to individually authenticate the two different command port connections. In this embodiment, client 240 may be executing two different applications and each application requires a separate RDMA connection. In another embodiment, client 240 may be executing a single application that requires multiple RDMA connections.

Server 200 also supports client 260 utilizing management port 210. As discussed earlier, a server may have a small number of management ports and a large number of command ports and, therefore, a server may use a single management port to support multiple command ports. Client 260 uses management port 265 and command port 270 to authenticate a command port connection with server 200 over command port 270 and 230.

Figure 3A:
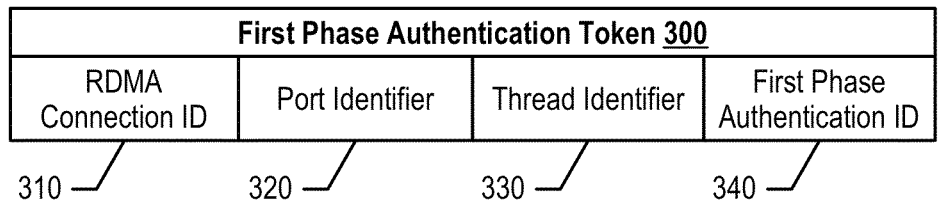
FIG. 3A is a diagram showing fields included in a first phase authentication token.

FIG. 3A is a diagram showing fields included in a first phase authentication token. A server generates first phase authentication token 300 in response to receiving a client request over a command port connection (e.g., RDMA connection). First phase authentication token 300, in one embodiment, includes RDMA connection ID 310, port identifier 320, thread identifier 330, and first phase authentication ID 340.

RDMA connection ID 310 includes an internal value associated with the RDMA connection in order to track RDMA connections between different client applications and the server. Port identifier 320 identifies the port or file number on the server associated with the RDMA connection. Thread identifier 330 identifies a thread that processes the RDMA connection (if applicable). First phase authentication ID 340 includes a value associated with authenticating the client's RDMA connection.

In one embodiment, first phase authentication token 300 is opaque outside the server. In this embodiment, the authentication tokens may be encrypted with a random salt and phase phrase that the server manages in order for the authentication tokens to be unreadable external to the server.

Figure 3B:
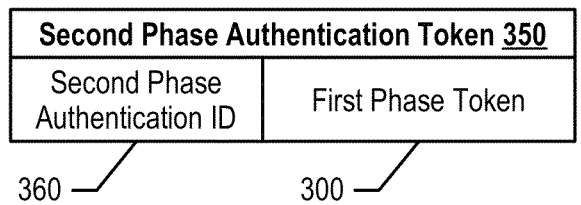
FIG. 3B is a diagram showing fields included in a second phase authentication token.

FIG. 3B is a diagram showing fields included in a second phase authentication token. The server provides second phase authentication token 350 to a client when the client provides the first phase authentication token back to the server.

Second phase authentication token 350, in one embodiment, includes second phase authentication ID 360 and first phase token 300. As such, a server is able to match a client's first phase authentication token and second phase authentication token in order to determine when the client's command port connection is fully authenticated.

In one embodiment, second phase authentication token 350 is opaque outside the server, similar to that of first phase authentication token 300 discussed above. In this embodiment, second phase authentication token 350 may be encrypted with a random salt and phase phrase that the server manages in order for the authentication tokens to be unreadable outside the server.

FIG. 4 is a diagram showing an authentication table utilized by a server to track command port connection authentications. In one embodiment, the server adds/removes authentication table entries to authentication table 400 to manage the two phase authentication process described herein. The example shown in FIG. 4 shows authentication table entries 450, 455, 460, 465, and 470, each corresponding to different command port connection authentications between the server and clients.

Table 400, in one embodiment, includes columns 410, 420, 425, 430, and 440. Column 410 includes information that identifies the server's management port that passes authentication information between the client. The example shown in FIG. 4 shows that the server currently uses management port "A" for each authentication table entry but, as those skilled in the art can appreciate, the server may also utilize multiple management ports to establish connections if they are available.

Column 420 includes information that identifies the server's command port for each corresponding authentication table entry, and column 425 includes information that identifies a thread executing on the server that processes the corresponding client authentication. In one embodiment, the server utilizes the command port ID and the thread ID to match the received second phase authentication token to one of the authentication table entries to determine whether the client is in the first phase or the second phase of authentication.

Column 430, in one embodiment, includes identifiers that identify the client or client application that corresponds to the command port authentications. Column 440 includes phase indicators that indicate the phase of each authentication. Authentication table entry 455 includes a first phase indicator, which indicates that such authentication has passed the first phase authentication and is in process of the second phase of authentication. Authentication table entry 450 includes a second phase indicator, which indicates that such authentication is fully authenticated and the client may send data to/from the server over the authentication command port connection. Authentication table entry 460 does not include a phase indicator, suggesting that such authentication is in the first phase of authentication.

Figure 5:
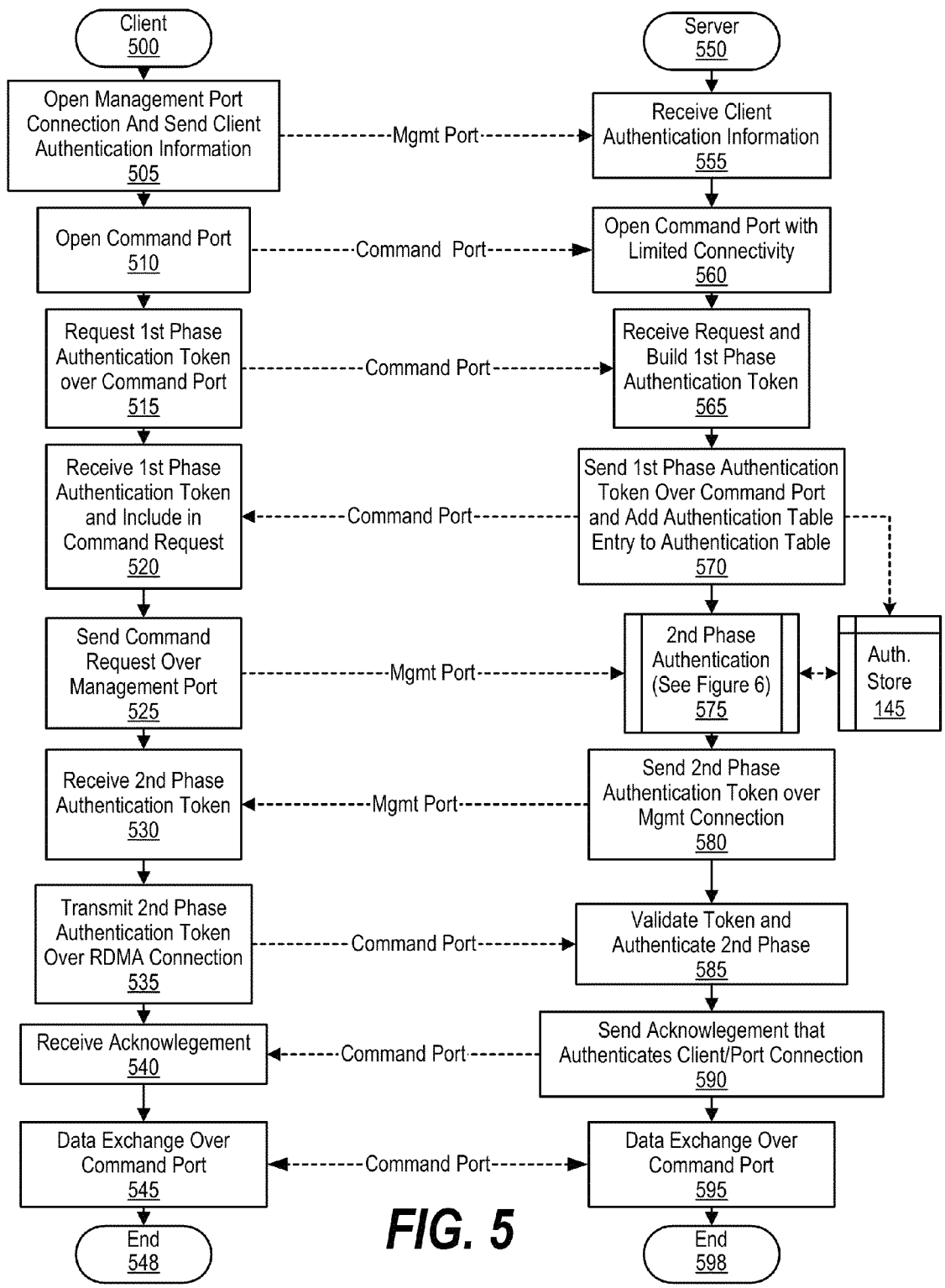
FIG. 5 is a flowchart showing steps taken in a server authenticating a command port connection with a client.

FIG. 5 is a flowchart showing steps taken in a server authenticating a command port connection with a client. Client processing commences at 500, whereupon the client opens a management port connection with the server and sends client authentication information to the server over the management port at step 505. Server processing commences at 550, whereupon the server receives the client authentication information at step 555 and authenticates the client (e.g., application) over the management port connection.

At steps 510 and 560, the client and server (respectively) open up a command port, such as for and RDMA connection. In one embodiment, the command port at this point provides limited connectivity and may process authentication commands. Next, at step 515, the client requests a first phase authentication token from the server through the command port. At step 565, the server receives the client's requests and builds a first phase authentication token (see FIG. 3A and corresponding text for further details). The server, at step 570, sends the first phase authentication token to the client over the command port. In addition, the server adds an authentication table entry to an authentication table stored in authentication store 145, thus identifying the corresponding authentication process commencing with the client.

The client receives the first phase authentication token at 520. The client, in one embodiment, includes the first phase authentication token in a command request and sends the command request (second phase authentication request) to the server over the management port at step 525. The server analyzes the first phase authentication token included in the second phase authentication request and builds a second phase authentication token that, in one embodiment, includes the first phase authentication token (pre-defined process block 575, see FIG. 6 and corresponding text for further details). In addition, the server updates the authentication table entry in authentication store 145 that indicates the corresponding authentication process has completed the first phase of authentication (see FIG. 4 and corresponding text for further details).

At step 580, the server sends the second phase authentication token to the client over the management port, which the client receives at step 530. In turn, the client sends the second phase authentication token back to the server over the command port connection at step 535. The server, at step 585, validates the second phase authentication token and identifies the corresponding authentication table entry in authentication store to determine the phase of the corresponding authentication. In one embodiment, the server utilizes a command port ID and a thread ID included in the second phase authentication token to identify the matching authentication table entry.

The server, at step 585, updates the authentication table entry (changing the first phase indicator to a second phase indicator) and sends an acknowledgement back to the client over the command port that the client is authenticated to send/receive data over the command port connection, thus completing the two-phase authentication process.

The client receives the acknowledgement at step 540. In turn, the client and server exchange data over the command port connection at steps 545 and 595, and client/server processing ends at 548 and 598.

Figure 6:
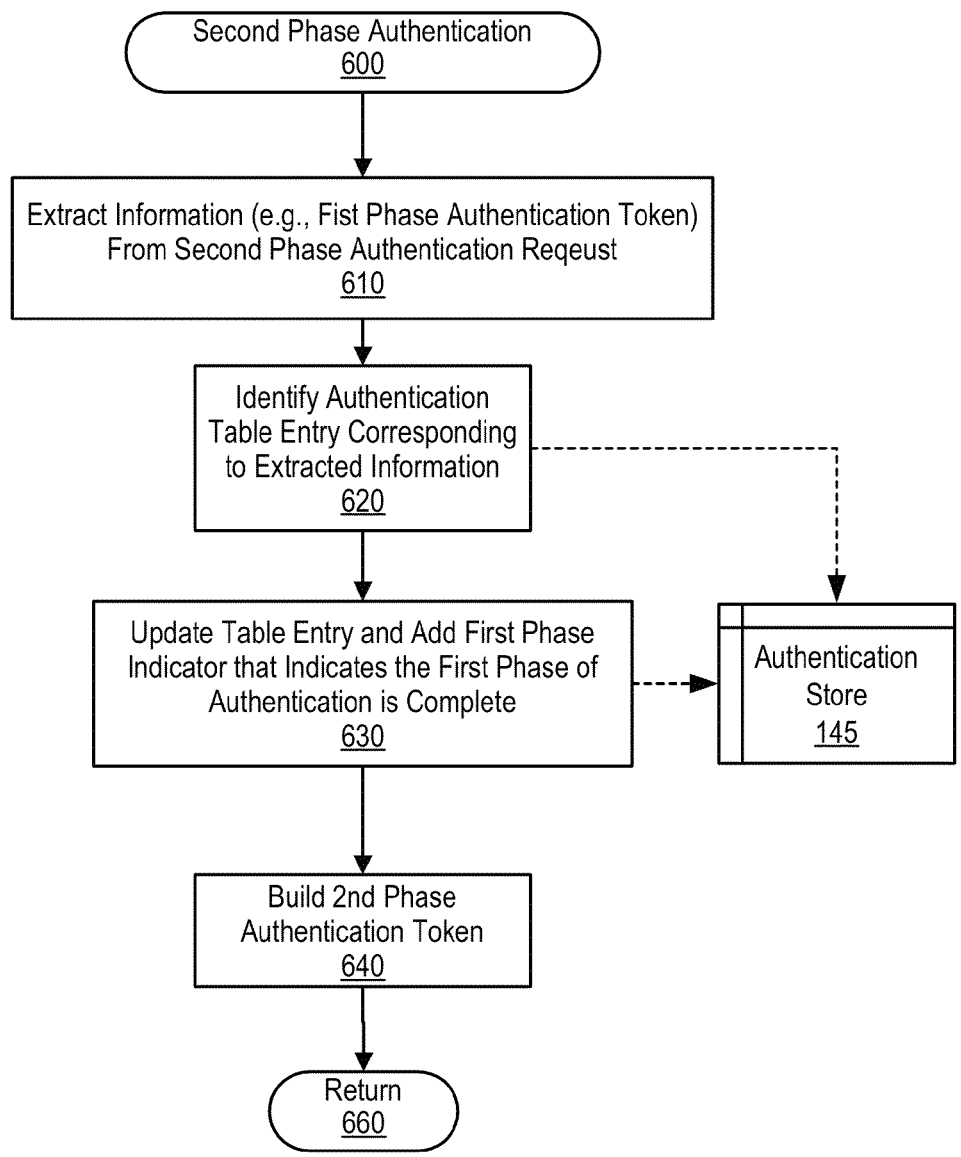
FIG. 6 is a flowchart showing steps taken in a server building a second phase authentication token in response to receiving a second phase authentication request.

FIG. 6 is a flowchart showing steps taken in a server building a second phase authentication token in response to receiving a second phase authentication request. Processing commences at 600, whereupon the server extracts information from the second phase authentication request that allows the server to determine the phase of the corresponding authentication process (step 610). In one embodiment, the server extracts the first phase authentication token that the client included in the request.

Next, the server identifies the authentication table entry stored in authentication table store 145 utilizing, in one embodiment, a command port identifier and a thread identifier included in the extracted information. At step 630, the server updates the authentication table entry in authentication store 145, indicating that the client's first phase authentication is complete.

Next, the server builds a second phase authentication token for the client that, in one embodiment, includes the first phase authentication token or some identifier that links the second phase authentication token to the first phase authentication token (step 640). Server processing returns at 660.

Figure 7:
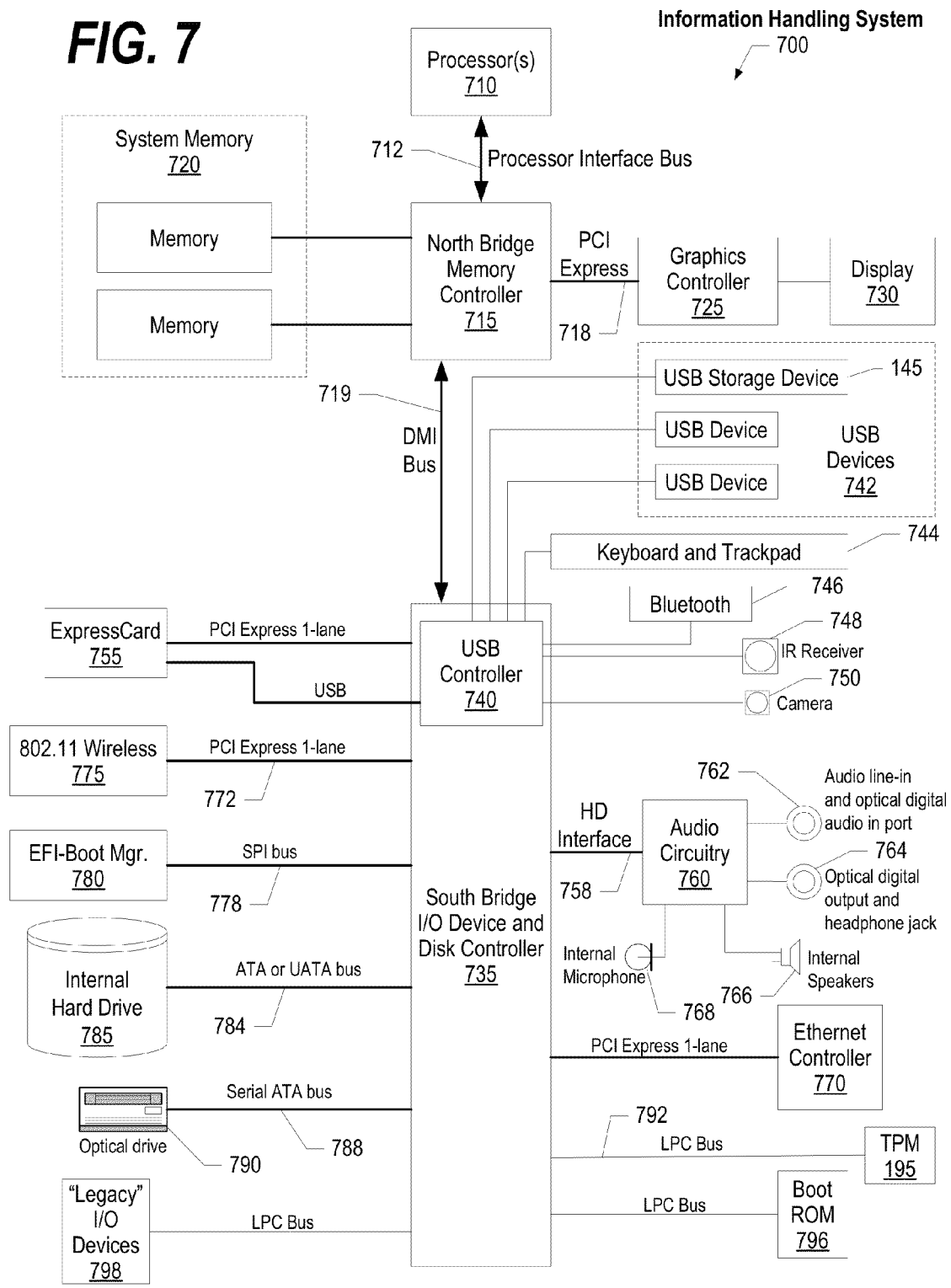
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
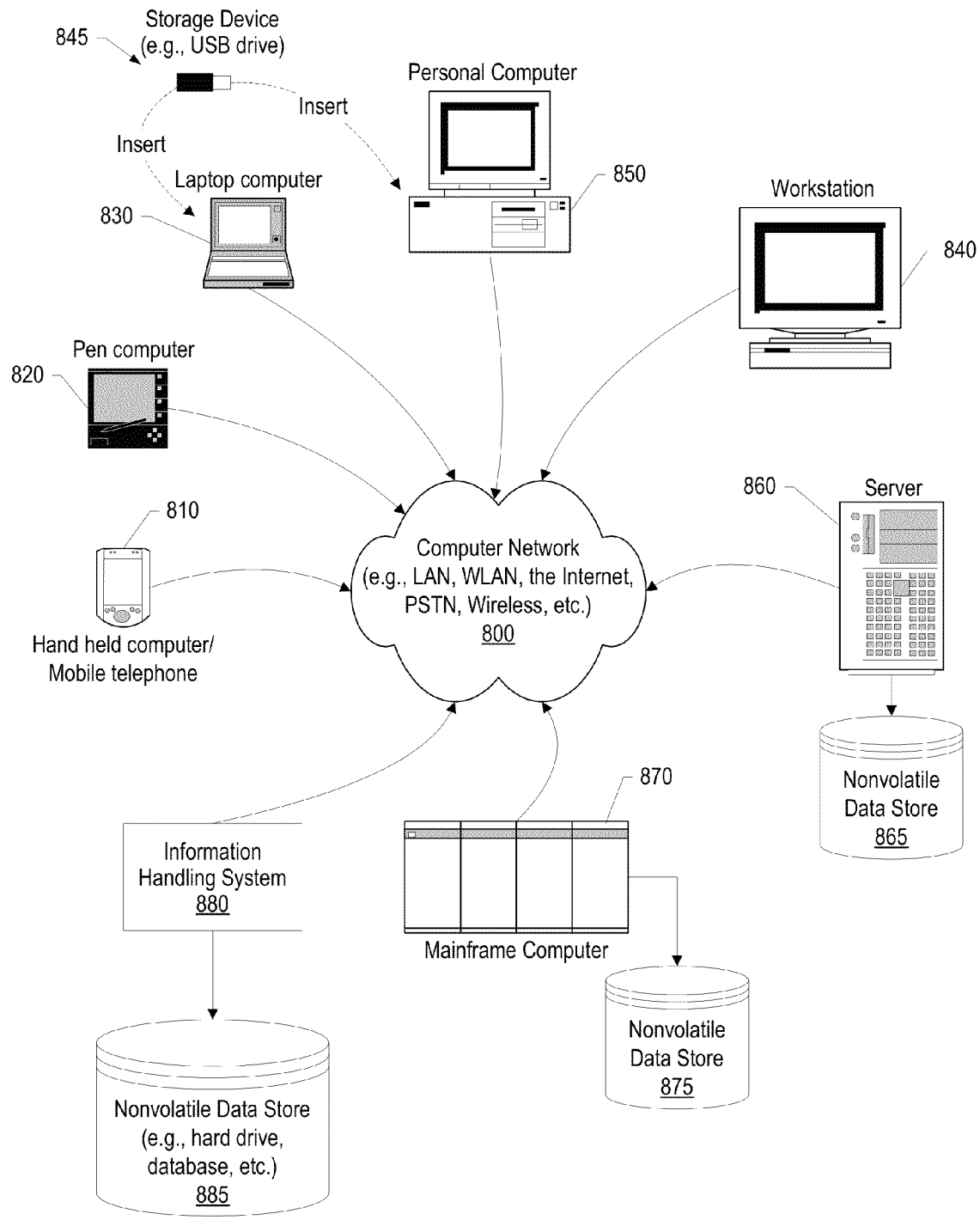
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   a set of computer program instructions stored in the memory and executed by at least one of the processors in order to perform actions of:
      receiving, at a server, a first request from a client over a command port connection;
      sending a first phase authentication token to the client over the command port connection in response to receiving the first request;
      receiving, at the server, a second request over a management port connection from the client;
      sending a second phase authentication token to the client over the management port connection in response to receiving the second request;
      receiving, at the server, the second phase authentication token from the client over the command port connection; and
      authenticating the client to utilize the command port connection in response to receiving the second phase authentication token.

2. The information handling system of claim 1 wherein the second request includes the first phase authentication token, the processors performing additional actions comprising:
   extracting the first phase authentication token from the second request;
   validating the extracted first phase authentication token; and
   storing, in response to validating the extracted first phase authentication token, a first phase indicator in an authentication table entry that indicates the client completing a first phase authentication over the command port connection.

3. The information handling system of claim 1 wherein the processors perform additional actions comprising:
   matching the received second phase authentication token to the authentication table entry; and
   identifying that the authentication table entry includes the first phase indicator.

4. The information handling system of claim 1 further comprising:
  wherein the command port connection is a Remote DMA (RDMA) connection; and
  wherein the management port connection is a TCPIP (Transmission Control Protocol/Internet Protocol) connection.

5. The information handling system of claim 4 wherein the RDMA connection utilizes a Direct Access Provider Library (DAPL).

6. The information handling system of claim 1 wherein the processors perform additional actions comprising:
  receiving, at the server, a different first request from a different client over a different command port connection;
  sending a different first phase authentication token to the different client over the different command port in response to receiving the first request;
  receiving, at the server, a different second request over the management port connection from the different client;
  sending a different second phase authentication token to the different client over the management port connection in response to receiving the different second request;
  receiving, at the server, the different second phase authentication token over the different command port connection from the different client; and
  authenticating the different client to utilize the different command port connection in response to receiving the different second phase authentication token.

7. The information handling system of claim 1 wherein the processors perform additional actions comprising:
  receiving, at the server, a different first request from the client over a different command port connection;
  sending a different first phase authentication token to the client over the different command port in response to receiving the first request;
  receiving, at the server, a different second request over the management port connection from the client;
  sending a different second phase authentication token to the client over the management port connection in response to receiving the different second request;
  receiving, at the server, the different second phase authentication token over the different command port connection from the client; and
  authenticating the client to utilize the different command port connection in response to receiving the different second phase authentication token.

8. The information handling system of claim 7 wherein the client executes a first application and a second application, the first application utilizing the command port connection to send data to the server and the second application utilizing the different command port to send different data to the server.

9. A computer program product stored in a non-transitory computer readable storage medium, comprising computer program code that, when executed by an information handling system, causes the information handling system to perform actions comprising:
  receiving, at a server, a first request from a client over a command port connection;
  sending a first phase authentication token to the client over the command port connection in response to receiving the first request;
  receiving, at the server, a second request over a management port connection from the client;
  sending a second phase authentication token to the client over the management port connection in response to receiving the second request;
  receiving, at the server, the second phase authentication token from the client over the command port connection; and
  authenticating the client to utilize the command port connection in response to receiving the second phase authentication token.

10. The computer program product of claim 9 wherein the second request includes the first phase authentication token, the information handling system performing further actions comprising:
  extracting the first phase authentication token from the second request;
  validating the extracted first phase authentication token; and
  storing, in response to validating the extracted first phase authentication token, a first phase indicator in an authentication table entry that indicates the client completing a first phase authentication over the command port connection.

11. The computer program product of claim 9 wherein the information handling system performs further actions comprising:
  matching the received second phase authentication token to the authentication table entry; and
  identifying that the authentication table entry includes the first phase indicator.

12. The computer program product of claim 9 further comprising:
  wherein the command port connection is a Remote DMA (RDMA) connection; and
  wherein the management port connection is a TCPIP (Transmission Control Protocol/Internet Protocol) connection.

13. The computer program product of claim 12 wherein the RDMA connection utilizes a Direct Access Provider Library (DAPL).

14. The computer program product of claim 9 wherein the information handling system performs further actions comprising:
  receiving, at the server, a different first request from a different client over a different command port connection;
  sending a different first phase authentication token to the different client over the different command port in response to receiving the first request;
  receiving, at the server, a different second request over the management port connection from the different client;
  sending a different second phase authentication token to the different client over the management port connection in response to receiving the different second request;
  receiving, at the server, the different second phase authentication token over the different command port connection from the different client; and
  authenticating the different client to utilize the different command port connection in response to receiving the different second phase authentication token.

15. The computer program product of claim 9 wherein the information handling system performs further actions comprising:
  receiving, at the server, a different first request from the client over a different command port connection;
  sending a different first phase authentication token to the client over the different command port in response to receiving the first request;
  receiving, at the server, a different second request over the management port connection from the client;

sending a different second phase authentication token to the client over the management port connection in response to receiving the different second request;

receiving, at the server, the different second phase authentication token over the different command port connection from the client; and authenticating the client to utilize the different command port connection in response to receiving the different second phase authentication token.

16. The computer program product of claim 15 wherein the client executes a first application and a second application, the first application utilizing the command port connection to send data to the server and the second application utilizing the different command port to send different data to the server.

* * * * *